(12) United States Patent
Komoda et al.

(10) Patent No.: US 12,115,665 B2
(45) Date of Patent: Oct. 15, 2024

(54) HANDLING SYSTEM, TRANSPORT SYSTEM, CONTROL DEVICE, STORAGE MEDIUM, AND HANDLING METHOD

(71) Applicant: Kabushiki Kaisha Toshiba, Tokyo (JP)

(72) Inventors: Kazuma Komoda, Kawasaki (JP); Seiji Tokura, Kawasaki (JP); Haruna Eto, Kawasaki (JP); Akihito Ogawa, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 284 days.

(21) Appl. No.: 17/652,122

(22) Filed: Feb. 23, 2022

(65) Prior Publication Data
US 2022/0274252 A1     Sep. 1, 2022

(30) Foreign Application Priority Data
Feb. 26, 2021   (JP) ................................. 2021-030860

(51) Int. Cl.
*B25J 9/16*     (2006.01)
*B25J 15/00*    (2006.01)
*B25J 15/06*    (2006.01)

(52) U.S. Cl.
CPC .......... *B25J 9/1612* (2013.01); *B25J 9/1653* (2013.01); *B25J 9/1694* (2013.01); *B25J 15/0052* (2013.01); *B25J 15/0616* (2013.01)

(58) Field of Classification Search
CPC ...... B25J 9/1612; B25J 9/1653; B25J 9/1694; B25J 15/0052; B25J 15/0616;
(Continued)

(56) References Cited

U.S. PATENT DOCUMENTS 8,690,213 B2     4/2014 Harada et al.
10,500,735 B1*  12/2019 Menon ................. B25J 15/0061
(Continued)

FOREIGN PATENT DOCUMENTS

EP     3 617 936 A1    3/2020
EP     3 711 907 A1    9/2020
(Continued)

OTHER PUBLICATIONS

Mahler et al., "Learning ambidextrous robot grasping policies", Science Robotics, 4, eaau4984, 2019, 12 pages.

*Primary Examiner* — Abby Y Lin
*Assistant Examiner* — Dylan M Katz
(74) *Attorney, Agent, or Firm* — Oblon, McClelland, Maier & Neustadt, L.L.P.

(57) ABSTRACT

According to one embodiment, a handling system includes a movable arm, a holding unit, a sensor, and a controller. The holding unit is attached to the movable arm and capable of holding an object by selecting one or more of a plurality of holding methods. The sensor is capable of detecting a plurality of the objects. The controller controls the movable arm and the holding unit. The controller calculates a score based on a selected holding method for each object and each holding method on the basis of information acquired from the sensor. The controller selects a next object to be held and a holding method on the basis of the score. The controller calculates a position at which the selected object is held and a posture of the movable arm.

20 Claims, 7 Drawing Sheets

(58) Field of Classification Search
CPC ...... B25J 9/1697; B25J 9/1679; B25J 9/1602;
B25J 9/1661; B25J 15/065; B25J 18/00;
G05B 2219/39465; G05B 2219/39467;
G05B 2219/39484; G05B 2219/39533;
G05B 2219/39543; G05B 2219/39558;
G05B 2219/40053; G05B 2219/40306
See application file for complete search history.

(56) References Cited

U.S. PATENT DOCUMENTS

| | | | |
|---|---|---|---|
| 2013/0211593 A1* | 8/2013 | Domae | B25J 9/1612 |
| | | | 700/258 |
| 2018/0272535 A1 | 9/2018 | Ogawa et al. | |
| 2019/0308325 A1 | 10/2019 | Higo | |
| 2019/0389082 A1* | 12/2019 | Higo | B25J 9/1697 |
| 2020/0316782 A1 | 10/2020 | Chavez et al. | |
| 2021/0016456 A1 | 1/2021 | Lei et al. | |
| 2021/0078811 A1 | 3/2021 | Komoda et al. | |
| 2021/0122586 A1* | 4/2021 | Sun | B65G 47/917 |
| 2021/0291378 A1 | 9/2021 | Komoda et al. | |

FOREIGN PATENT DOCUMENTS

| | | |
|---|---|---|
| JP | 2012-236258 A | 12/2012 |
| JP | 5130509 B2 | 1/2013 |
| JP | 6516663 B2 | 5/2019 |
| JP | 2019-181687 A | 10/2019 |
| JP | 2019-188516 A | 10/2019 |
| JP | 2019-217608 A | 12/2019 |
| JP | 2020-032523 A | 3/2020 |
| JP | 6741329 B1 | 8/2020 |
| JP | 2020-151780 A | 9/2020 |
| JP | 2021-041513 A | 3/2021 |
| JP | 2021-146452 A | 9/2021 |

* cited by examiner

HANDLING SYSTEM, TRANSPORT SYSTEM, CONTROL DEVICE, STORAGE MEDIUM, AND HANDLING METHOD

CROSS-REFERENCE TO RELATED APPLICATION(S)

This application is based upon and claims the benefit of priority from Japanese Patent Application No. 2021-030860, filed Feb. 26, 2021; the entire contents of (all of) which are incorporated herein by reference.

FIELD

Embodiments of the present invention relate to a handling system, a transport system, a control device, a non-transitory computer-readable storage medium storing a control program, and a handling method.

BACKGROUND

Conventionally, a handling device in which an end effector holds a target object is known. Target objects with various shapes, sizes, and weights need to be able to be held for automation of a transfer operation in the field of logistics. When these target objects are held using a handling device, it is necessary to determine a holding strategy such as a holding position, a holding method, and the posture of a robot arm.

Also, when work is performed by selectively using a plurality of holding tools, it is necessary to switch holding methods.

DETAILED DESCRIPTION

Figure 1:
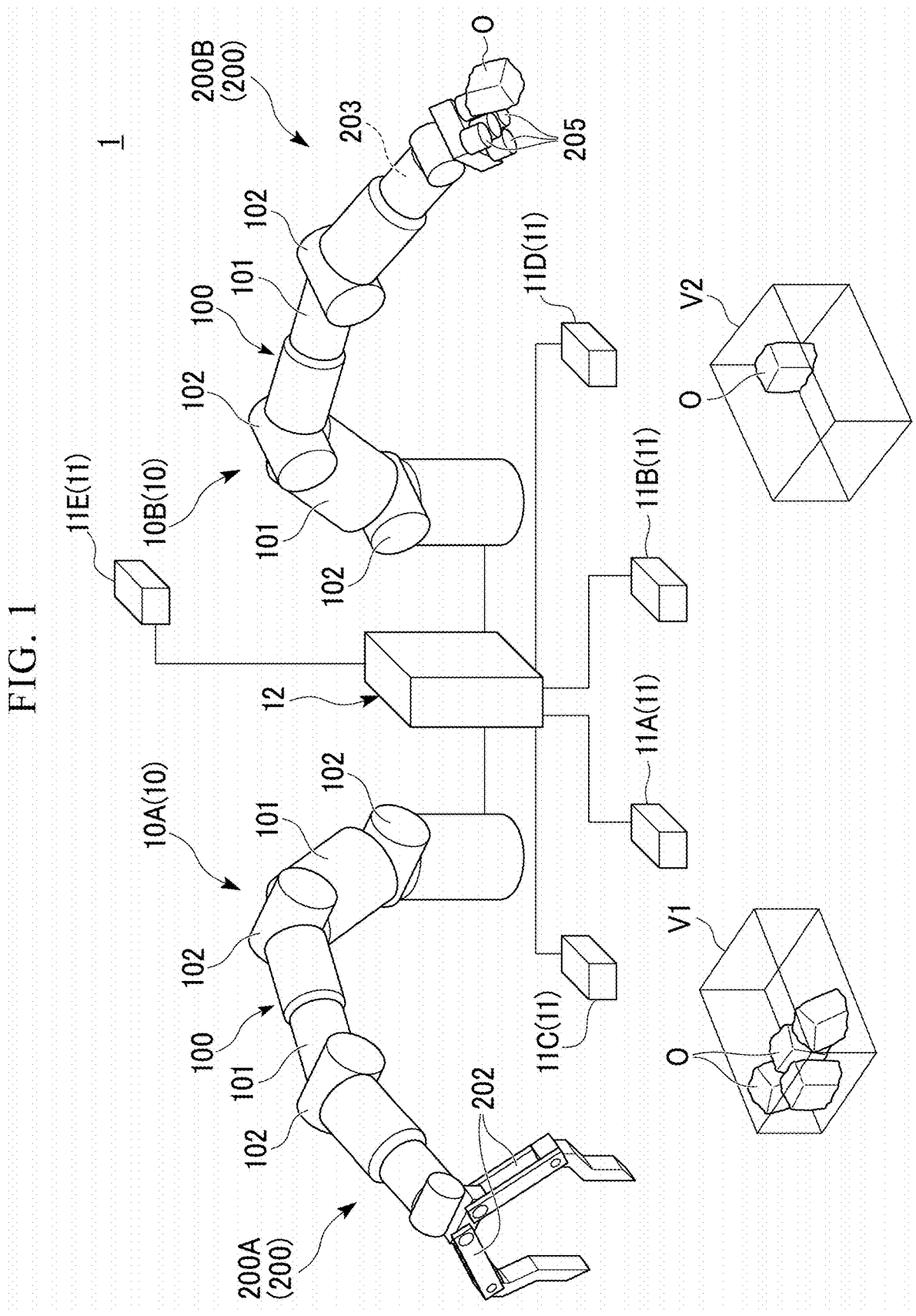
FIG. 1 is a perspective view which schematically shows a transport system including a handling system of a first embodiment.

According to one embodiment, a handling system includes a movable arm, a holding unit, a sensor, and a controller. The holding unit is attached to the movable arm and capable of holding an object by selecting one or more of a plurality of holding methods. The sensor is capable of detecting a plurality of objects. The controller controls the movable arm and the holding unit. The controller calculates a score based on a selected holding method for each object and each holding method on the basis of information acquired from the sensor. The controller selects a next object to be held and a holding method on the basis of the score. The controller calculates a position at which the selected object is held and a posture of the movable arm.

In the following description, a handling system, a transport system, a control device, a control program, and a handling method of the embodiments will be described with reference to the drawings.

In the following description, constituents having the same or similar functions are denoted by the same reference numerals. Duplicate description of such constituents may be omitted. In addition, "based on XX" in the present application means "based on at least XX," and includes a case of being based on another element in addition to XX. Moreover, "based on XX" is not limited to a case of directly using XX, but also includes a case of being based on a calculation or process performed on XX. "XX" is an arbitrary element (for example, arbitrary information).

First Embodiment

A first embodiment will be described with reference to FIGS. 1 to 9. FIG. 1 is a perspective view which schematically shows a transport system 1 including a handling device 10 (an example of a "handling system") of the present embodiment.

The transport system 1 is, for example, a handling system (picking system) for logistics. The transport system 1 moves an object (an object to be held, an object to be transported) O positioned at a movement source V1 to a movement destination V2. For example, the transport system 1 performs work of extracting a specified number of various types of objects O stored in the movement source V1 and loading them on the movement destination V2.

The movement source V1 is, for example, any of various types of conveyors, various types of pallets, a container such as a tote bag or a folding container, or the like. "Container" broadly refers to a member capable of accommodating an object O (for example, a box-shaped member). However, the movement source V1 is not limited to the example described above. In the following description, the "movement source V1" may be referred to as an "extraction source container V1."

The various types of objects O with different sizes and weights are randomly placed on the movement source V1. For example, an object O to be held has an uneven shape on at least a part of a surface of the object O. In the present embodiment, an outer shape of the object O varies from a small object such as 5 cm square to a large object such as 30 cm square. Moreover, the object O varies from a light object such as several tens of g to a heavy object such as several kg. However, the size and the weight of the object O are not limited to the example described above.

The movement destination V2 is, for example, a container such as a tote bag or a folding container. However, the movement destination V2 is not limited to the example described above. In the following description, the "movement destination V2" may be referred to as a "transport destination container V2," and the "movement source V1" and the "movement destination V2" may be simply collectively referred to as "containers." Note that the transport system 1 may move the object O to a movement destination V2 other than a container.

The transport system 1 is not limited to a handling system for logistics. The transport system 1 can be widely applied to industrial robot systems or other systems. The "transport system," "handling system," and "handling device" referred to in the present application are not limited to systems and devices whose main purpose is to transport objects, but include systems and devices that transport (move) objects as a part of product assembly or for another purpose.

As shown in FIG. 1, the transport system 1 has a handling device 10, a sensor 11, and a control device 12 (an example of a "controller"). The control device 12 may be incorporated in the handling device 10.

The handling device 10 is, for example, a robot device. The handling device 10 holds the object O positioned in the extraction source container V1 and moves the held object O to the transport destination container V2 (a keeping area). The handling device 10 can communicate with the control device 12 by wire or wirelessly. In the present embodiment, the handling device 10 includes a first handling device 10A and a second handling device 10B.

The first handling device 10A includes, for example, a movable arm 100 and a first holding unit 200A provided at a tip of the movable arm 100.

The movable arm 100 is a moving mechanism that moves the first holding unit 200A to a desired position. For example, the movable arm 100 is a six-axis vertical articulated robot arm. The movable arm 100 can take various positions and postures. Like human arms or hands, the movable arm 100 can take a wider variety of postures to hold an object. The movable arm 100 includes, for example, a plurality of arm members 101 and a plurality of rotating portions 102 in which a plurality of arm members 101 are rotatably connected.

The movable arm 100 may be a three-axis Cartesian robot arm. The movable arm 100 may be a mechanism for moving the first holding unit 200A to a desired position using other constituents. For example, the movable arm 100 may be a flying object (for example, a drone) that lifts and moves the first holding unit 200A using a rotary wing.

The first holding unit 200A is a holding mechanism (an end effector) that holds the object O positioned in the extraction source container V1. The first holding unit 200A has a pinching hand 202.

The pinching hand 202 is a gripper-type hand that holds and grips the object O with two fingers, and is provided at a tip of the movable arm 100. A configuration of the pinching hand 202 is not limited to this, and may be, for example, a gripper-type hand that holds and grips the object O with three fingers.

The first holding unit 200A may be a hybrid hand that further has a suction device and an adsorption unit that communicates with the suction device, and holds the object O by pinching and/or adsorption. In this case, the adsorption unit may be provided at a fingertip of the pinching hand 202. A plurality of adsorption units may be provided at the fingertips of the pinching hand 202.

The second handling device 10B has, for example, an arm (a second arm) 100 and a second holding unit 200B provided at the tip of the movable arm 100. The movable arm 100 of the second handling device 10B has the same configuration as the movable arm 100 of the first handling device 10A.

The second holding unit 200B is a holding mechanism (an end effector) that holds the object O positioned in the extraction source container V1. For example, the second holding unit 200B has a suction device 203 and an adsorption unit 205 that communicates with the suction device 203. The second holding unit 200B is an adsorption-type hand that holds the object O by adsorption.

The second holding unit 200B may also be a mechanism that holds the object O by another holding method. For example, the second holding unit 200B may be a holding unit capable of holding the object O by using a magnetic force. For example, the second holding unit 200B may also be a holding unit (for example, a jamming gripper) that is configured from a flexible membrane filled with powder and a vacuum pump that extracts air from the flexible membrane and is capable of holding the object O by using a jamming phenomenon.

The suction device 203 is, for example, a vacuum pump. The suction device 203 communicates with each of the plurality of adsorption units 205 via a hose or the like. The suction device 203 is driven, and thereby the pressure in each adsorption unit 205 becomes lower than atmospheric pressure, and the object O is adsorbed and held by the adsorption unit 205.

The adsorption unit 205 is provided at a tip of the second holding unit 200B. For example, a plurality of adsorption units 205 are provided at the tip of the second holding unit 200B. The adsorption unit 205 has an outer shape smaller than the smallest object O positioned in the extraction source container V1. The second handling device 10B adsorbs and holds the object O using only one or more adsorption units 205 selected from the plurality of adsorption units 205.

In the following description, the "first holding unit 200A" and the "second holding unit 200B" are collectively referred to as the "holding unit 200." That is, the "holding unit 200" includes the "first holding unit 200A" and the "second holding unit 200B." Here, it has been described that the first holding unit 200A is a pinching-type hand and the second holding unit 200B is an adsorption-type hand. However, the configuration of the holding unit 200 is not limited to one provided with one first holding unit 200A that is a pinching-type hand and one second holding unit 200B that is an adsorption-type hand as described above. In the present embodiment, a case in which both the first holding unit 200A and the second holding unit 200B are pinching-type hands or adsorption-type hands is also included. In this case, the holding unit 200 may be configured to have a plurality of pinching-type hands that are different in at least any one of characteristics such as configuration, structure, shape, size, and arrangement. Specifically, for example, the first holding unit 200A and the second holding unit 200B may be two or more pinching-type hands having different nail lengths and opening widths. In addition, the holding unit 200 may be configured to have a plurality of adsorption-type hands which are different in at least any one of the characteristics such as configuration, structure, shape, size, and arrangement. Specifically, for example, the first holding unit 200A and the second holding unit 200B may be two or more adsorption-type hands having different adsorption pad arrangements, adsorption pad diameters, bellows structures, and the like. Even in such cases, it is possible to perform the same processing and obtain the same effect in the present embodiment.

The sensor 11 can detect states of a plurality of objects O and/or the holding unit 200 by being controlled by the control device 12. The sensor 11 includes a first sensor 11A, a second sensor 11B, a third sensor 11C, a fourth sensor 11D, and a fifth sensor 11E. The first sensor 11A, the second sensor 11B, the third sensor 11C, the fourth sensor 11D, and the fifth sensor 11E are connected to the control device 12 by wire or wirelessly.

The first sensor 11A is a camera or any of various sensors arranged near the movement source V1 (for example, directly above or diagonally above the movement source V1). The first sensor 11A acquires, for example, information on the object O positioned at the movement source V1 and information on the movement source V1. The information acquired by the first sensor 11A is, for example, "image data," "distance image data," "shape data," and the like. "Distance image data" is image data having distance information in one or more directions (for example, depth information from an arbitrary reference plane set above the movement source V1). "Shape data" is information indicating an outer shape of the object O and the like. The information detected by the first sensor 11A is output to the control device 12. The first sensor 11A may be provided as a part of the handling device 10.

The second sensor 11B is a camera or any of various sensors arranged near the movement destination container V2 (for example, directly above or diagonally above the movement destination container V2). The second sensor 11B detects, for example, information on the shape of the movement destination container V2 (including shapes of the inner wall surface and the partition) and information on an object O previously placed in the movement destination container V2. The information acquired by the second sensor 11B is, for example, "image data," "distance image data," "shape data," and the like. The information detected by the second sensor 11B is output to the control device 12. The second sensor 11B may be provided as a part of the handling device 10.

The third sensor 11C is any of various sensors provided in the first holding unit 200A or near the first holding unit 200A. The third sensor 11C acquires information on physical states of the first holding unit 200A, such as a distortion of the first holding unit 200A, a pressure applied to the first holding unit 200A, and a surface state of the first holding unit 200A. The third sensor 11C includes, for example, one or more physical sensors such as a distortion sensor, a pressure sensor, and a close contact sensor. The third sensor 11C may further acquire physical information of the object O. The information detected by the third sensor 11C is output to the control device 12. The third sensor 11C may be provided as a part of the handling device 10.

The fourth sensor 11D is any of various sensors provided in the second holding unit 200B or near the second holding unit 200B. The fourth sensor 11D acquires, for example, information on physical states of the second holding unit 200B, such as a distortion of the second holding unit 200B, a pressure applied to the second holding unit 200B, and a surface state of the second holding unit 200B. The fourth sensor 11D includes, for example, one or more physical sensors such as a distortion sensor, a pressure sensor, and a close contact sensor. The fourth sensor 11D may further acquire the physical information of the object O. The information detected by the fourth sensor 11D is output to the control device 12. The fourth sensor 11D may be provided as a part of the handling device 10.

The fifth sensor 11E acquires information on a usage status of the holding unit 200. For example, the fifth sensor 11E detects, for example, a holding unit 200 currently used or selected for use between the first holding unit 200A and the second holding unit 200B (hereinafter, a holding unit currently used or selected for use may be generically referred to as a "currently selected holding unit" or simply a "selected holding unit"). The information detected by the fifth sensor 11E is output to the control device 12. The fifth sensor 11E may be provided as a part of the handling device 10. Moreover, the currently selected holding unit 200 may be determined on the basis of other information such as a control history of the handling device 10 instead of the fifth sensor 11E and the information acquired by the third sensor 11C or the fourth sensor 11D. In this case, the fifth sensor 11E can be omitted. In addition, when the holding unit 200 is a hybrid hand capable of performing pinching, adsorption, and both pinching and adsorption, the control device 12 determines, on the basis of information from the fifth sensor 11E or other information, whether the holding unit 200 is in a state suitable for pinching an object O, in a state suitable for adsorption, or in a state suitable for performing both.

The control device 12 manages and controls an entire transport system 1. For example, the control device 12 acquires the information detected by the first sensor 11A to the fifth sensor 11E, and controls the handling device 10 on the basis of the acquired information. The control device 12 is, for example, a device that can execute a program (a computer) and includes a processor, a memory, and the like.

Figure 2:
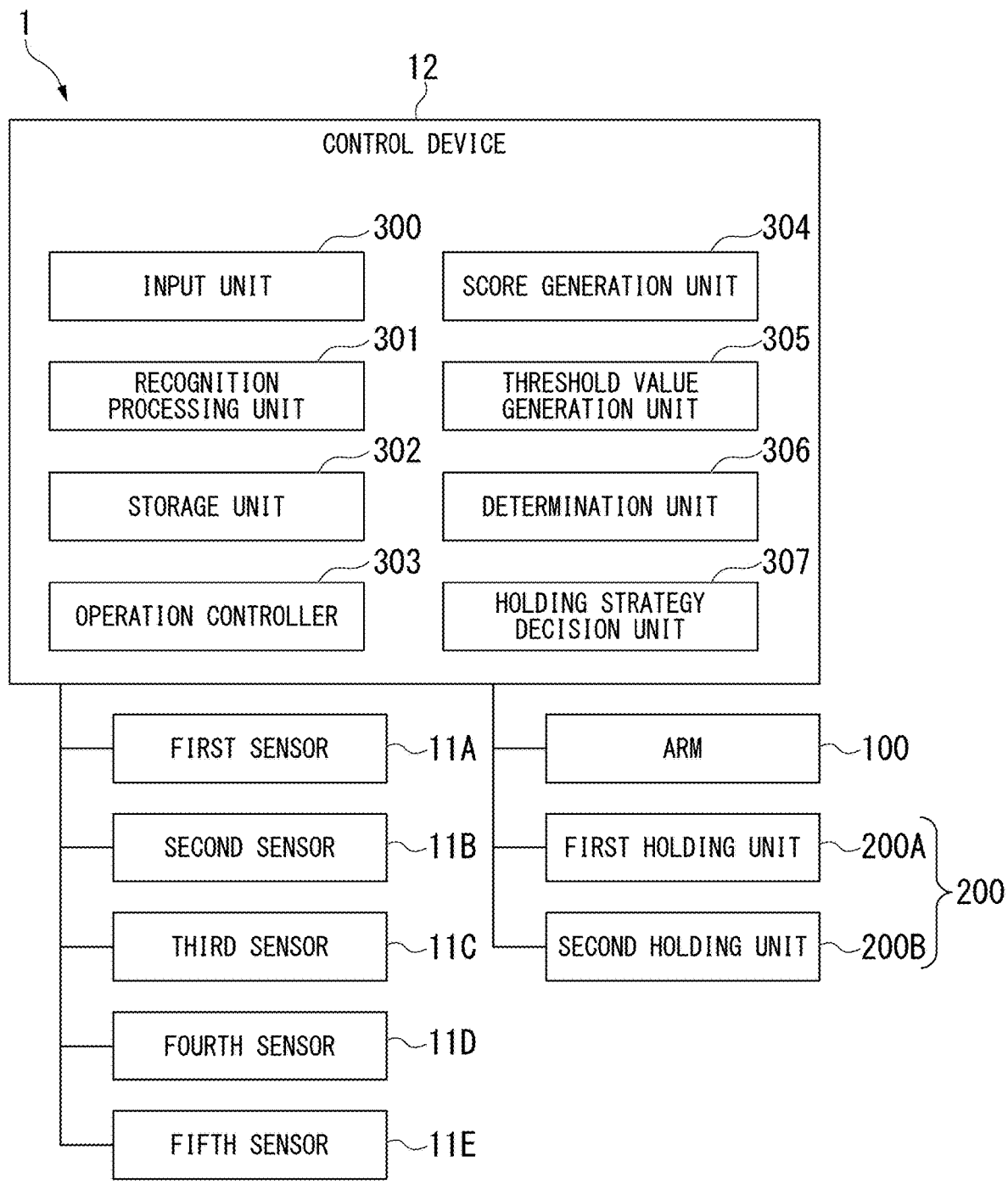
FIG. 2 is a block diagram which shows a system configuration of the transport system including the handling system of the first embodiment.
Figure 3:
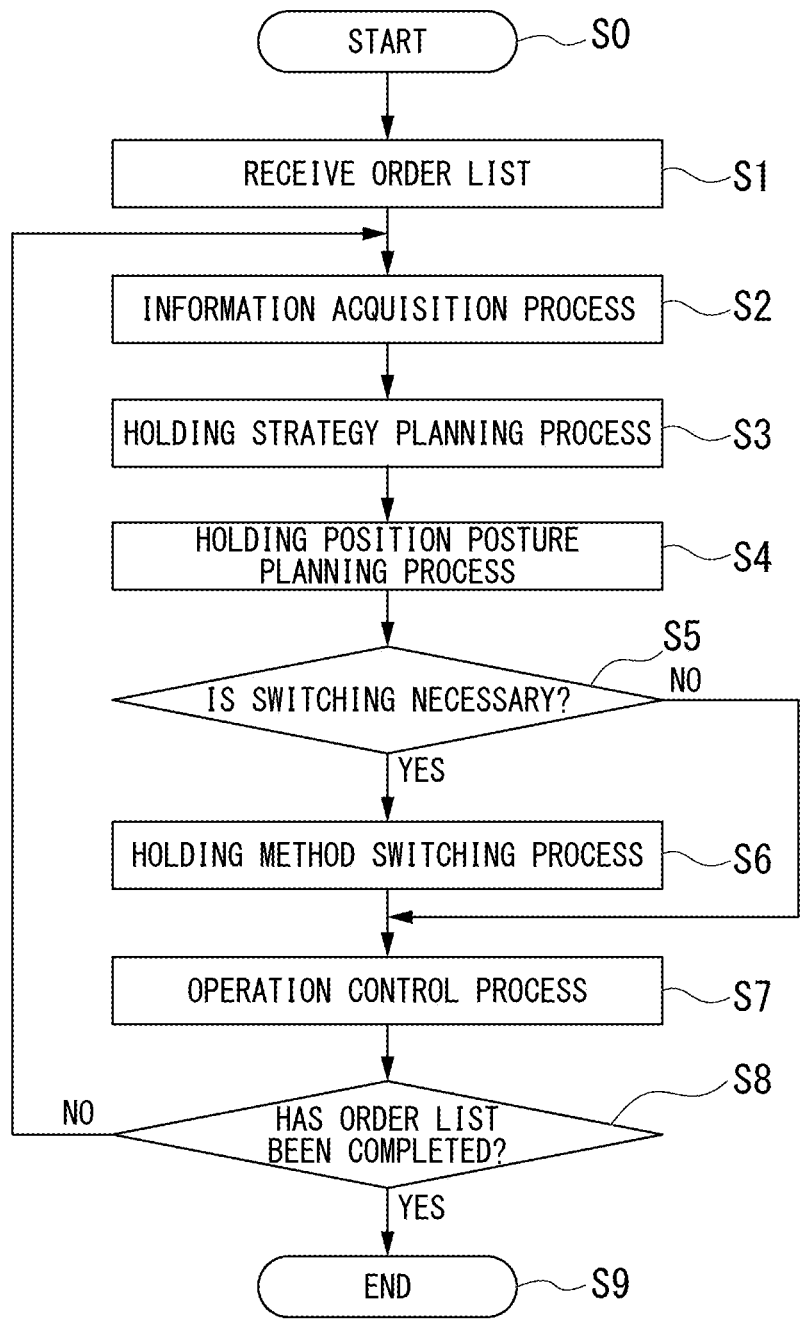
FIG. 3 is a control flowchart for a control device of the first embodiment.

FIG. 2 is a block diagram which shows a system configuration of the transport system 1.

The control device 12 includes an input unit 300, a recognition processing unit 301, a storage unit 302, an operation controller 303, a score generation unit 304, a threshold value generation unit 305, a determination unit 306, and a holding strategy decision unit 307.

The input unit 300 receives an order list regarding the object O to be held from an operator or a system, information acquired by the first sensor 11A to the fifth sensor 11E, and the like.

The recognition processing unit 301 processes the information acquired by the first sensor 11A to the fifth sensor 11E. For example, the recognition processing unit 301 determines the position, posture, shape, characteristics, and the like of the object O in the movement source V1 on the basis of image data acquired by the first sensor 11A.

The storage unit 302 records shape data on the object O to be picked up, the order list received from the operator or system, various scores generated by the score generation unit 304, a threshold value generated by the threshold value generation unit 305, a result of determination by the determination unit 306, a holding strategy decided by the holding strategy decision unit 307, a control history or operation history of the handling device 10, and the like. The shape data stored in the storage unit 302 is defined in a local coordinate system of the object O.

The operation controller 303 controls operations of the movable arm 100, the first holding unit 200A, the second holding unit 200B, and the like of the handling device 10. For example, the operation controller 303 specifically calculates a position at which an object O is held and a posture of the movable arm 100 at the time of holding the object that are appropriate for holding the specific object O with a specific holding method. Moreover, the operation controller 303 instructs the handling device 10 to cause the first holding unit 200A or the second holding unit 200B to perform an operation of holding a specific object O on the basis of the calculated position at which the object O is held and the posture of the movable aim 100 at the time of holding the object.

The score generation unit 304 generates scores for deciding a priority of an object O to be held and a holding method. For example, the score generation unit 304 calculates a first score and a second score to be described below.

The threshold value generation unit 305 generates a threshold value for determining whether a holding method needs to be switched. For example, the threshold value generation unit 305 generates a threshold value for the second score to be described below.

The determination unit 306 determines whether a holding method needs to be switched on the basis of a score generated by the score generation unit 304, a threshold value generated by the threshold value generation unit 305, and the like.

The holding strategy decision unit 307 decides a holding strategy that includes a target to be held and a holding method of high priority, an order of holding targets to be held, an order of a holding operation and a switching operation of holding methods, and the like on the basis of the score generated by the score generation unit 304, the threshold value generated by the threshold value generation unit 305, a result of determination by the determination unit 306, and the like.

All or a part of functions of the control device 12 are realized by, for example, one or more processors such as a central processing unit (CPU) or a graphics processing unit (GPU) executing a program stored in a program memory. However, all or a part of these functions may also be realized by hardware (for example, a circuit unit; circuitry) such as large-scale integration (LSI), an application specific integrated circuit (ASIC), a field-programmable gate array (FPGA), and a programmable logic device (PLD). Moreover, all or a part of the functions described above may be realized by a combination of software and hardware. The storage unit 302 is realized by a flash memory, an electrically erasable programmable read-only memory (EEPROM), a read-only memory (ROM; reading-dedicated memory), a random-access memory (RAM; readable and writable memory), or the like.

Next, an operation of the transport system 1 will be described. The description will be given according to a control flowchart of the control device 12 shown in FIG. 3.

When the control device 12 is activated, the control device 12 starts control of the handling device 10 after implementing initialization of the handling device 10 and the sensor 11 (step S0). Next, the control device 12 executes step S1.

In step S1, the input unit 300 of the control device 12 receives an order list of an object O to be picked up from an operator or a system (order list receiving process).

Next, the control device 12 executes step S2. In step S2, the input unit 300 of the control device 12 receives image data, distance image data, shape data, and the like regarding an object O of the extraction source container V1 from the first sensor 11A. The recognition processing unit 301 of the control device 12 determines whether there is an object O in the order list in the extraction source container V1 on the basis of data received by the input unit 300. Moreover, the recognition processing unit 301 acquires information on the shape, position, posture, and the like of the object O to be picked up on the basis of the data received by the input unit 300 (information acquisition process).

Figure 4:
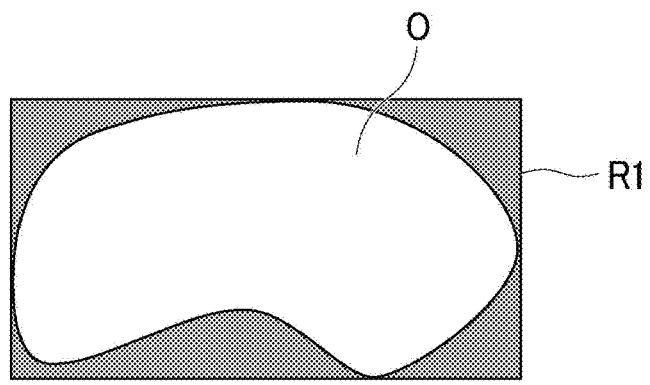
FIG. 4 is a diagram which shows a temporary mask area in image data of an object when an object O is held by "pinching.

FIG. 4 is a diagram which shows a temporary mask area R1 in the image data of the object O when the object O is held by "pinching."

The recognition processing unit 301 of the control device 12 sets a rectangular area (circumscribed rectangular area) circumscribing the object O to be picked up from the image data as the "temporary mask area R1" by using a known image segmentation method. The image segmentation may be performed with a method using machine learning.

Figure 5:
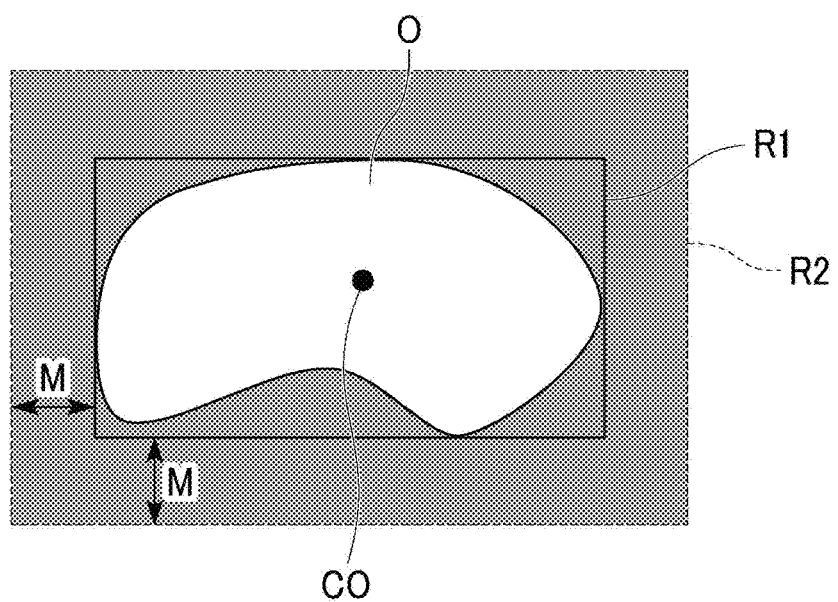
"
FIG. 5 is a diagram which shows a mask area in image data of an object.

FIG. 5 is a diagram which shows a mask area R2 in the image data of the object O.

The recognition processing unit 301 sets an area extended in vertical and horizontal directions of the temporary mask area R1 as a "mask area R2." The mask area R2 is extended by a margin M in vertical and horizontal directions of the circumscribed rectangular area. For example, the margin M is 100 mm By using the extended mask area R2, the recognition processing unit 301 can determine whether there is a space in which the pinching hand 202 can go around the object O when a holding method by the holding unit 200 is pinching.

Figure 6:
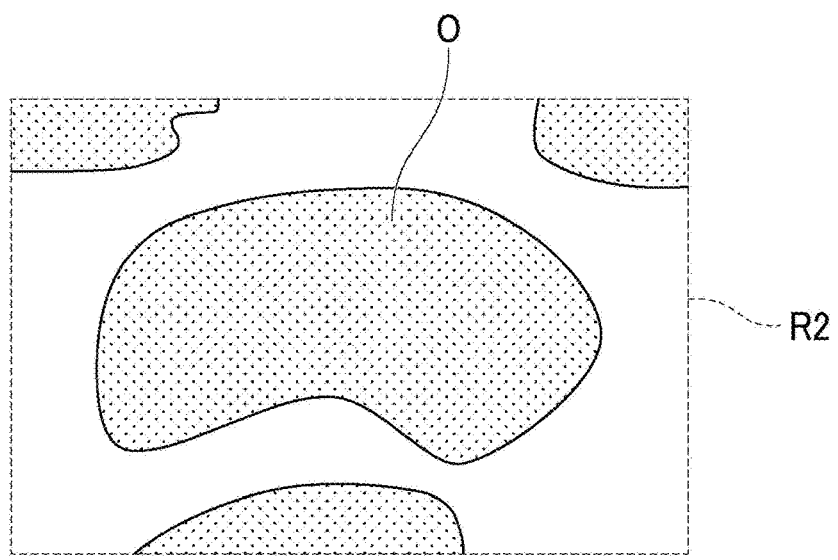
FIG. 6 is a diagram which shows a depth image of an object.

FIG. 6 is a diagram which shows a depth image D of the object O.

The recognition processing unit 301 uses distance image data to generate a depth image D visualizing depth information of the object O in the mask area R2. The depth image D has a height based on an origin of a world coordinate system (an X axis, a Y axis, and a Z axis) as a value. A scale of the depth image D can be changed according to a holding method by the holding unit 200. The scale of the depth image D can be set to, for example, 1 mm per pixel.

Figure 7:
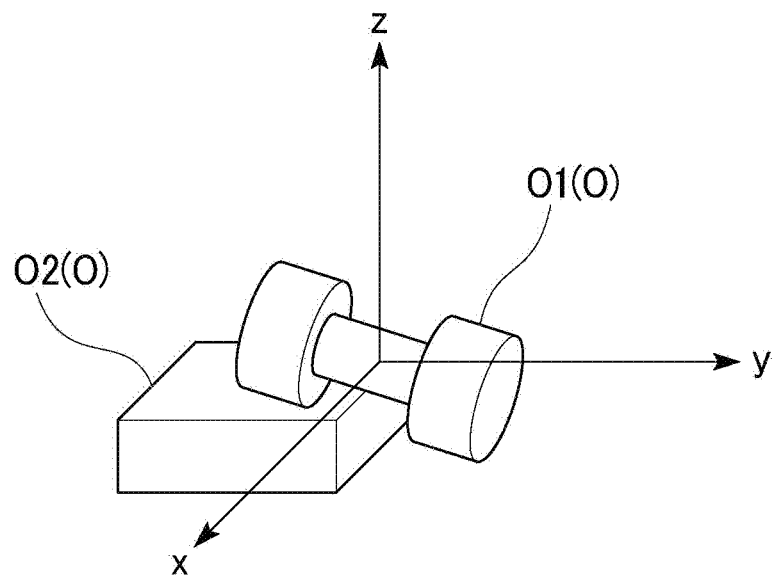
FIG. 7 is a diagram which describes a three-dimensional position and a posture of an object.

FIG. 7 is a diagram for describing a three-dimensional position and a posture of the object O. In FIG. 7, objects O having different shapes are described as "O1" and "O2."

The recognition processing unit 301 calculates the three-dimensional position and posture of the object O1 from the acquired image data of the object O1. The recognition processing unit 301 converts the shape data of the object O1 recorded in the storage unit 302 in a local coordinate system into the world coordinate system (the X axis, the Y axis, and the Z axis) using a transformation matrix. As shown in FIG. 7, a Z-axis direction of the world coordinate system is a depth direction from an arbitrary reference plane set above the extraction source container V1. The recognition processing unit 301 calculates the three-dimensional position and posture of the object O1 by comparing the acquired image data of the object O1 with the shape data converted into the world coordinate system.

Figure 8:
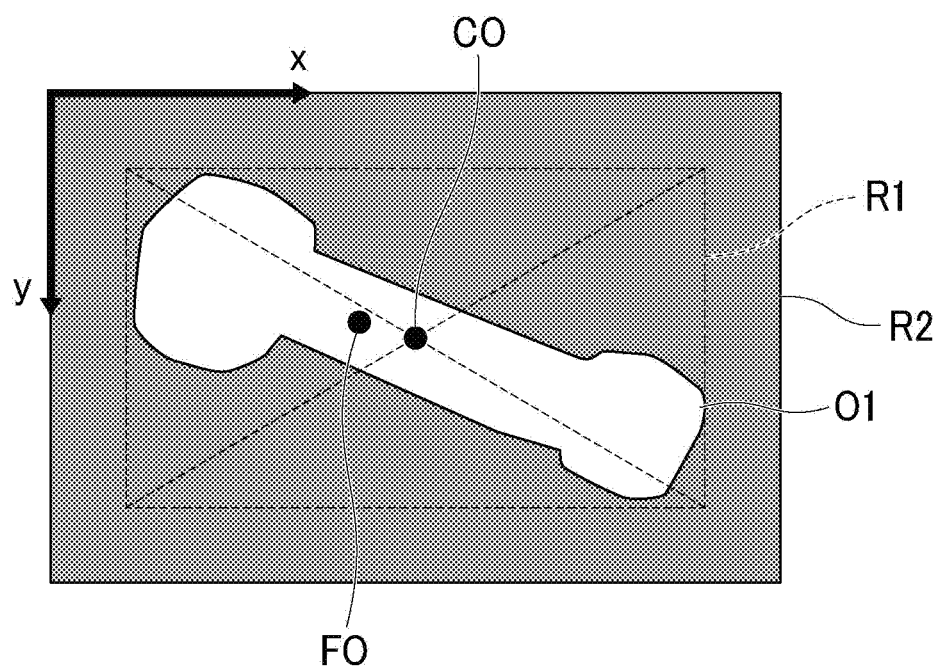
FIG. 8 is a diagram which shows a mask area to which information on the three-dimensional position and the posture is added.

FIG. 8 is a diagram which shows the mask area R2 to which information on the three-dimensional position and posture is added. The recognition processing unit 301 sets the three-dimensional position and posture, which serve as a reference of the object O1, as a center CO of a circumscribed rectangular area (the temporary mask area R1) in a mask image R2. In addition, the recognition processing unit 301 may calculate and use a centroid FO of the object O1 separately from the center CO of the circumscribed rectangular area in consideration of the ease of pinching by the pinching hand 202.

On the other hand, when the object O is held by "adsorption," the temporary mask area R1 is divided into mask planes that can be adsorption targets on a surface of the object O. The recognition processing unit 301 generates the mask image R2 and the depth image D for each mask plane, and defines a direction perpendicular to a mask plane as a normal direction. The recognition processing unit 301 extracts, for example, a plane area from a point group of a three-dimensional sensor, and sets a minor axis direction as x, a major axis direction as y, and a normal direction of a plane as z by, for example, principal component analysis, thereby deciding the position and the posture. In the case of "pinching," only one holding area may be defined for one object O, and there may be a plurality of holding areas for one object O in the case of "adsorption." For this reason, a target to be held in "adsorption" may be one area of the object O. For example, when there are a plurality of holding areas of "pinching," the target to be held in "pinching" may be one area of the object O.

When the object O is held by "adsorption," the recognition processing unit 301 can perform convolution processing for calculating how many of the plurality of adsorption units 205 are used, at what angle the adsorption unit 205 is brought into contact with the object O, and the like.

The recognition processing unit 301 may use a database in which the three-dimensional position and the posture of the object O from when the object O was successfully picked up before are recorded. The recognition processing unit 301 can also use the database to output a recommended holding method and holding position for the object O.

The input unit 300 receives information on the physical state of the first holding unit 200A from the third sensor 11C and also receives information on the physical state of the second holding unit 200B from the fourth sensor 11D, when necessary. In addition, the input unit 300 receives information on a usage status of the holding unit 200 such as a currently selected holding unit from the fifth sensor 11E, when necessary. The recognition processing unit 301 determines which of the first holding unit 200A and the second holding unit 200B is the currently selected holding unit 200 on the basis of the information from the fifth sensor 11E and/or other information. The information on physical states of the first holding unit 200A and the second holding unit 200B and the information on the currently selected holding unit 200 may be appropriately acquired at a timing other than step S2.

In addition, the input unit 300 receives physical information of an object O to be held from the database. For example, the input unit 300 can receive information on outer shape information, a weight, a surface material, friction characteristics, and the like of the object O from the database. The database may be defined for each individual object O, or may be used by defining basic information primitives (for example, rectangular parallelepipeds, cylinders, spheres, quadrangular pyramids, or the like), and the like and applying information close to the shape thereto.

Figure 9:
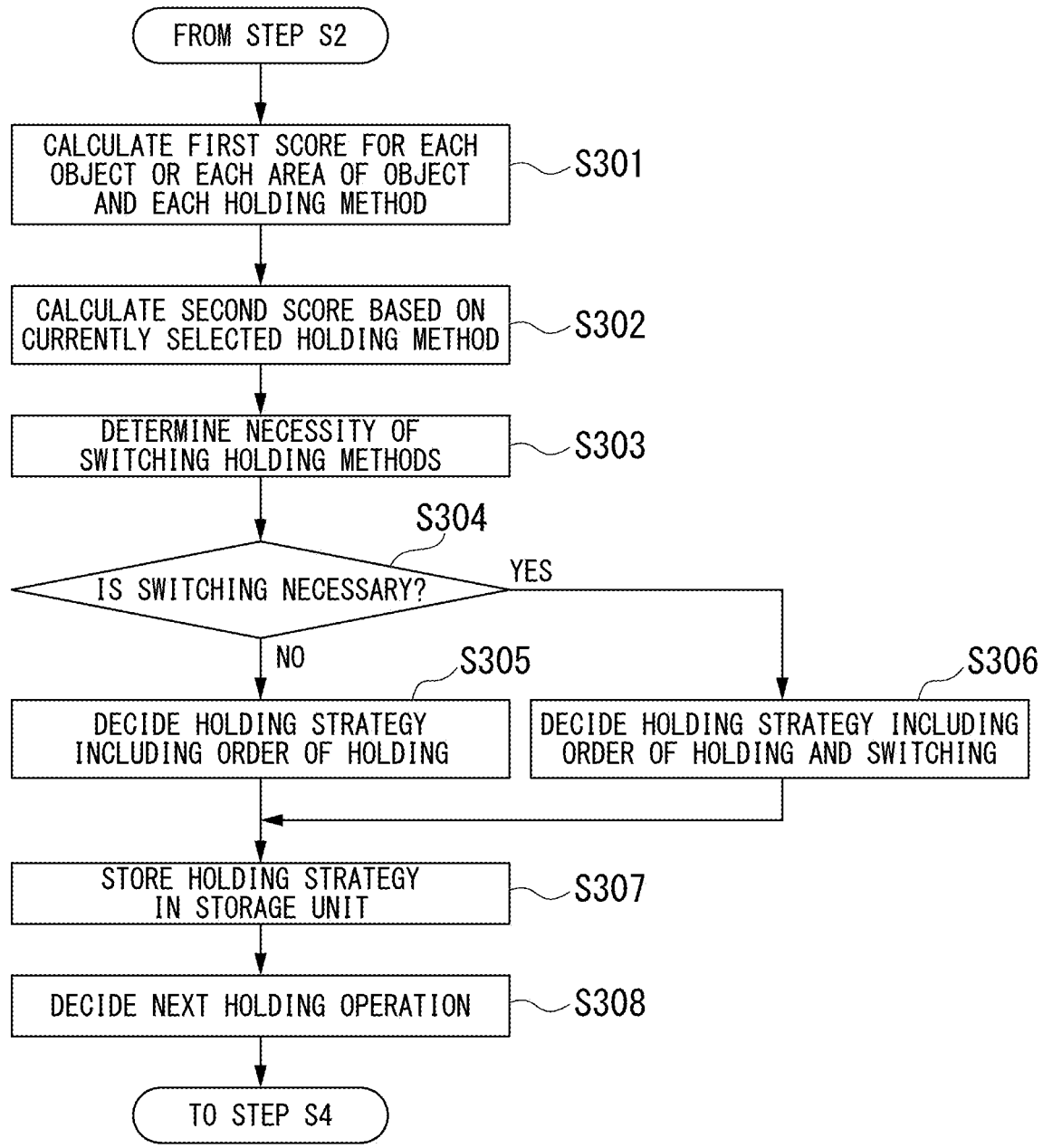
FIG. 9 is a control flowchart of a holding strategy planning process of a control device according to the first embodiment.

Next, the control device 12 executes step S3. In step S3, the control device 12 calculates a score for each object O or each area of an object O and each holding method, and then decides a next object O to be held and a holding method (a holding strategy planning process). FIG. 9 is a control flowchart of the holding strategy planning process performed by the control device 12, and shows detailed contents of step S3.

In step S301, the score generation unit 304 of the control device 12 calculates the ease of holding that the holding unit 200 holds the object O as a "first score" on the basis of the information acquired in step S2. The score generation unit 304 calculates a first score for (1) each object O or each area of an object O (hereinafter, also simply referred to as "each object O") and (2) each holding method. For example, the holding method is "pinching" by the first handling device 10A or "adsorption" by the second handling device 10B. When the holding method is "pinching," for example, the first score is calculated for each object O, and, when the holding method is "adsorption," for example, the first score is calculated for each area of the object O.

The first score $S_H(I)$ to be calculated in step S301 is calculated by, for example, an evaluation function shown in Equation 1.

$$S_H(I) = \sum_i w_{Hi} f_{Hi} = w_{H1} f_{H1} + w_{H2} f_{H2} + w_{H3} f_{H3} + \ldots \quad \text{[Math 1]}$$

In Equation 1, H is a holding method (pinching by the first handling device 10A, adsorption by the second handling device 10B, or the like) which is an evaluation target of the first score. I is the mask area R2 indicating an object O or an area of the object O that is the evaluation target of the first score. $f_i$ is an evaluation item of an evaluation function, and $w_i$ is a weight of the evaluation function. That is, the evaluation function described above is represented by a linear combination of each evaluation item. However, the evaluation function is not limited to the example described above, and an average value may be used for an evaluation item, a non-linear function may be used, and any evaluation function can be used. Moreover, the evaluation item is not limited to an item described in Equation 1, and may be, for example, an amount depending on physical identification of the object O or the pinching hand 202.

When the holding method is "pinching" (H=p), a first score $S_p$ (I) is calculated by, for example, an evaluation function shown in Equation 2.

$$S_p(I) = \sum_i w_{pi} f_{pi} = \quad \text{[Math 2]}$$
$$w_{p1} f_{p1} + w_{p2} f_{p2} + w_{p3} f_{p3} + w_{p4} f_{p4} + w_{p5} f_{p5} + w_{p6} f_{p6}$$

In Equation 2, $w_{p1}+w_{p2}+w_{p3}+w_{p4}+w_{p5}+w_{p6}=1$ and $w_{pi} \geq 0$ (i=1, 2, 3, 4, 5, 6). $f_{p1}$ is a position of an object O (for example, a center position of an object O and a height of an object O). $f_{p2}$ is an unevenness ratio of the object O. $f_{p3}$ is a flatness of the object O. $f_{p4}$ is a difference in depth between the object O and a periphery of the object O. $f_{p5}$ is a result of determining whether the object O is thin. $f_{p6}$ is an evaluation item used when machine learning is used, and incorporates all the evaluation items such as $f_{p1}$ to $f_{p5}$ described above. For this reason, for example, when $f_{p6}$ is used, $w_{p1}$ to $w_{p5}$ may be set to zero. The first score $S_p$ (I) of "pinching" is calculated for various mask areas is indicating each object O.

When the holding method is "adsorption" (H=s), the first score $S_s$ (I) is calculated by, for example, an evaluation function shown in Equation 3.

$$S_{1s}(I) = \quad \text{[Math 3]}$$
$$\sum_i w_{si} f_{si} = w_{s1} f_{s1} + w_{s2} f_{s2} + w_{s3} f_{s3} + w_{s4} f_{s4} + w_{s5} f_{s5} + w_{s6} f_{s6}$$

In Equation 3, $w_{s1}+w_{s2}+w_{s3}+w_{s4}+w_{s5}+w_{s6}=1$ and $w_{si} \geq 0$ (i=1, 2, 3, 4, 5, 6). $f_{s1}$ is a position of an area of an object O (for example, a center position of an area of an object O and a height of an object O). $f_{s2}$ is an unevenness ratio of the area of the object O. $f_{s3}$ is a square measure of the area of the object O. $f_{s4}$ is an approach angle with respect to the area of the object O (for example, an angle formed by a normal direction and a vertical direction of the area of the object O). $f_{s5}$ is a result of determining whether the object O is thin. $f_{s6}$ is an evaluation item to be used when machine learning is used, and incorporates all the evaluation items such as $f_{s1}$ to $f_{s5}$ described above. For this reason, for example, when $f_{s6}$ is used, $w_{s1}$ to $w_{s5}$ may be set to zero. The first score $S_s$ (I)

of "adsorption" is calculated for various mask areas I indicating the area of the object O.

In this manner, the score generation unit 304 calculates a first score $S_H(I)$ for each object O or each area of the object O for each holding method (here, pinching by the first handling device 10A and adsorption by the second handling device 10B).

Next, the control device 12 executes step S302. In step S302, the score generation unit 304 of the control device 12 calculates a "second score" based on a currently selected holding method on the basis of the information acquired in step S2 and the first score calculated in step S301. The score generation unit 304 calculates the second score for (1) each object O or each area of an object O and (2) each holding method.

The second score $T_{H,H_0}(I)$ to be calculated in step S302 is calculated by, for example, an evaluation function shown in Equation 4.

$$T_{H,H_0}(I) = g(S_H(I), S_{H_0}(I)) = \frac{S_{H_0}(I)}{S_H(I)} \qquad \text{[Math 4]}$$

In Equation 4, H is a holding method that is an evaluation target of the second score. $H_0$ is a currently selected holding method. I is the mask area R2 indicating an object O or an area of the object O that is the evaluation target of the second score. That is, the evaluation function of Equation 4 is a ratio of a first score $S_{H_0}(I)$ of the currently selected holding method to the first score $S_H(I)$ of the holding method that is an evaluation target of the second score. However, an evaluation function of the second score is not limited to the example described above, and any function can be used. For example, it may be any function that depends on the first score $S_{H_0}(I)$ of the currently selected holding method $H_0$ and the first score $S_H(I)$ of the holding method that is the evaluation target of the second score.

Since the first score $S_H(I)$ is an index of the "ease of holding" of the target mask area I by a target holding method H, when the evaluation function of Equation 4 described above is used, the second score $T_{H,H_0}(I)$ is a ratio between the ease of holding in the currently selected holding method $H_0$ and the ease of holding in the target holding method H. That is, when the second score of Equation 4 is larger than 1, the currently selected holding method $H_0$ is easier to perform holding than the target holding method H. When the second score of Equation 4 is smaller than 1, the target holding method H is easier to perform holding than the currently selected holding method $H_0$. For example, when the second score of Equation 4 is 0.5, it can be said that the ease of holding in the currently selected holding method $H_0$ is 0.5 times the ease of holding in the target holding method H. That is, it can be said that the ease of holding in the target holding method H is twice the ease of holding in the currently selected holding method $H_0$.

Next, the control device 12 executes step S303. In step S303, the determination unit 306 of the control device 12 determines a necessity of switching holding methods on the basis of the second score $T_{H,H_0}(I)$. When the second score $T_{H,H_0}(I)$ of Equation 4 described above is used, for example, the determination unit 306 determines that it is necessary to switch holding methods from the currently selected holding method $H_0$ to the target holding method H when a conditional expression of Equation 5 to be described is satisfied, and determines that it is not necessary to switch holding methods from the currently selected holding method $H_0$ to the target holding method H when the conditional expression of Equation 5 is not satisfied.

$$T_{H,H_0}(I) = \frac{S_{H_0}(I)}{S_H(I)} < Th \qquad \text{[Math 5]}$$

In Equation 5, Th is a predetermined threshold value generated by the threshold value generation unit 305. That is, when the second score $T_{H,H_0}(I)$ is lower than the threshold value, the determination unit 306 determines that it is necessary to switch holding methods from the currently selected holding method $H_0$ to the target holding method H, and determines that it is not necessary to switch holding methods from the currently selected holding method $H_0$ to the target holding method H when the second score $T_{H,H_0}(I)$ is equal to or higher than the threshold value.

When a holding method is selected only with the first score $S_H(I)$, since information of the currently selected holding method $H_0$ is not reflected in the first score $S_H(I)$, a holding method with a high success rate of holding is simply selected. For this reason, it may be determined that it is necessary to switch holding methods every time the object O is held in some cases, and, in such a case, it may take time to switch holding methods. On the other hand, the second score $T_{H,H_0}(I)$ is a score that includes information on the currently selected holding method $H_0$ and is calculated on the basis of the currently selected holding method $H_0$. For example, when the second score $T_{H,H_0}(I)$ of Equation 4 described above is used, even when the second score $T_{H,H_0}(I)$ is smaller than 1 (that is, the ease of holding in the target holding method H is larger than the ease of holding in the currently selected holding method $H_0$), the determination unit 306 determines that it is not necessary to switch holding methods when the second score $T_{H,H_0}(I)$ is not so small (that is, when it is equal to or higher than a predetermined threshold value). As a result, the control device 12 can control the handling device 10 so as to perform holding in the currently selected holding method $H_0$ as much as possible when the currently selected holding method $H_0$ is reasonably easy to perform holding.

The determination unit 306 may determine the necessity of switching holding methods on the basis of a magnitude relationship between an average value of second scores $T_H$ and $H_0(I)$ calculated for each mask area I indicating an object O or the area of an object O to be held and the threshold value Th, and may also determine the necessity of switching holding methods on the basis of a magnitude relationship between each of the second scores $T_H$ and $H_0(I)$ for each mask area I and the threshold value Th. For example, in the example described above, the determination unit 306 determines that it is necessary to switch holding methods when at least one of the second scores $T_H$ and $H_0(I)$ for each mask area I is smaller than the threshold value Th.

Next, when it is determined that it is necessary to switch holding methods (No in step S304), the control device 12 executes step S305. In step S305, the holding strategy decision unit 307 of the control device 12 decides a holding strategy including an order of holding a plurality of objects O to be held. When the currently selected holding method $H_0$ is "pinching," the holding strategy decision unit 307 can, for example, set the order of holding the objects O as a descending order of the first score $S_p(I)$ for "pinching." In addition, when the currently selected holding method $H_0$ is "adsorption," the holding strategy decision unit 307 can set, for example, the order of holding the objects O as a descending order of the first score $S_s$ (I) for "adsorption." That is, the holding strategy decision unit 307 can decide a holding strategy of picking up an object O in the currently selected holding method $H_0$, for example, in a descending order of the first score $S_{H0}$ (I) without switching the currently selected holding method $H_0$.

Next, the control device 12 executes step S307. In step S307, the control device 12 stores a holding strategy including a holding order decided by the holding strategy decision unit 307 in the storage unit 302 in step S305.

Next, the control device 12 executes step S308. In step S308, the holding strategy decision unit 307 of the control device 12 determines a next holding operation. For example, the holding strategy decision unit 307 sets an earliest holding operation in the holding strategy decided in step S305 (in the example described above, the currently selected holding method H0 holding an object O having a largest first score $S_{H0}$ (I)) as a next holding operation. After that, the control device 12 advances processing to step S4.

On the other hand, when it is determined that it is necessary to switch holding methods (Yes in step S304), the control device 12 executes step S307. In step S307, the holding strategy decision unit 307 decides a holding strategy including an order of performing holding and switching holding methods. That is, the holding strategy decision unit 307 decides a holding strategy including the order of performing the holding operation and the operation of switching holding methods for the plurality of objects O to be held. As an example, the holding strategy decision unit 307 can decide the order of performing holding and switching holding methods as follows.

(1) A holding operation is performed on an object O or the area of an object O in which the first score $S_{H0}$ (I) in the currently selected holding method $H_0$ is larger than the first score $S_{H1}$ (I) in a holding method $H_1$ after switching in the descending order of the first score $S_{H0}$ (I).

(2) Holding methods are switched from the currently selected holding method $H_0$ to the holding method $H_1$ of a switching destination.

(3) A holding operation can be performed on an object O or the area of an object O in which the first score $S_{H0}$ (I) in the currently selected holding method $H_0$ is smaller than the first score $S_{H1}$ (I) in the holding method $H_1$ after switching in a descending order of the first score $S_{H1}$ (I).

As a result, it possible to create a holding strategy that can pick up all objects O to be held by switching holding methods once, and it is possible to minimize the number of times holding methods are switched.

A method of determining a holding strategy is not limited to the example described above. For example, the holding strategy decision unit 307 may decide a holding strategy so as to perform holding on a target to be held whose second score $T_{H1,H0}$ (I) is equal to or higher than the threshold value Th in the currently selected holding method $H_0$, and then to switch holding methods to perform holding on a target to be held whose second score $T_{H,H0}$ (I) is lower than the threshold value Th in the holding method $H_1$ after switching. The holding strategy decision unit 307 may decide a holding strategy in any other method.

Next, the control device 12 executes step S307. In step S307, the control device 12 stores a holding strategy including the order of performing holding and switching holding methods decided by the holding strategy decision unit 307 in step S306 in the storage unit 302.

Next, the control device 12 executes step S308. In step S308, the holding strategy decision unit 307 of the control device 12 decides a next holding operation. For example, the holding strategy decision unit 307 sets the earliest holding operation in the holding strategy decided in step S306 as a next holding operation. For example, in examples shown in (1) to (3) described above, the holding strategy decision unit 307 can set holding one of an object O and the area of an object O in which the first score $S_{H0}$ (I) in the currently selected holding method $H_0$ is larger than the first score $S_{H1}$ (I) in the holding method $H_1$ after switching, which has the maximum first score $S_{H0}$ (I), in the currently selected holding method $H_0$ as a next holding operation. When there is neither an object O nor the area of an object O in which the first score $S_{H0}$ (I) in the currently selected holding method $H_0$ is larger than the first score $S_{H1}$ (I) by the holding method $H_1$ after switching, the holding strategy decision unit 307 can set holding an object O or an area of the object O whose first score $S_{H1}$ (I) in the holding method $H_1$ after switching is maximum in the holding method $H_1$ after switching as a next holding operation. After that, the control device 12 advances processing to step S4.

In the steps up to this point, the control device 12 preferably decides a next holding operation without specifically calculating the position at which an object O is held or the posture of the movable arm 100.

In the example described above, it is described that the control device 12 decides an entire holding order and selects the earliest holding operation in the order as a next operation, but the decision of a holding order may be omitted and only a next operation may be decided. For example, the holding strategy decision unit 307 may select holding an object O or an area of the object O with the maximum first score $S_H$ (I) as a next operation without deciding a holding order in step S305.

When a holding strategy is decided in step S305 or step S306, the control device 12 may also use a corrected score obtained by correcting the first score $S_H$ (I) or the second score $T_{H,H0}$ (I) using a weight of the object O or the like.

As mentioned above, a calculation standard of the first score $S_H$ (I) may differ depending on a holding method such that an evaluation item for calculating the first score $S_H$ (I) and an assumed target to be held (an object O, an area of the object O, or the like) are different between "pinching" and "adsorption." For this reason, the control device 12 may perform normalization of a score as appropriate so that even scores in different holding methods can be compared. The control device 12 may perform the normalization processing of a score in any step such as step S301 for calculating a first score, step S302 for calculating a second score, and steps S305, S306, and the like for deciding a holding strategy.

Details of step S3 have been described above, but, as an example herein, Tables 1 to 3 below show an example of calculation of the second score $T_{H,H0}$ (I) of Equation 4 described above when a selectable holding method is any one of "pinching" and "adsorption," the currently selected holding method $H_0$ is "pinching," and the threshold value Th is set to 0.5. Tables 1 to 3 are tables that show an example of score calculation. Tables 1 to 3 show a first score indicating the ease of holding in the holding method of "pinching," a first score indicating the ease of holding in the holding method of "adsorption," a second score calculated on the basis of these first scores, and a result of determination by the threshold value Th for targets to be held 1 to 5 representing an object O or an area of the object O. In the result of determination, "True" means that the second score $T_{H,H0}$ (I) is smaller than the threshold value Th (that is, it is necessary to switch holding methods), and "False" means that the second score $T_{H,H0}$ (I) is larger than the threshold value Th (that is, it is not necessary to switch holding methods).

TABLE 1

| Currently selected holding method: Pinching | | Object 1 | Object 2 | Object 3 | Object 4 | Object 5 | Average |
|---|---|---|---|---|---|---|---|
| First score | Pinching | 0.7 | 0.8 | 0.9 | 0.8 | 0.7 | 0.78 |
|  | Adsorption | 0.9 | 0.8 | 0.7 | 0.6 | 0.9 | 0.78 |
| Second score | Pinching/Adsorption | 0.78 | 1.00 | 1.29 | 1.33 | 0.78 | 1.03 |
|  | Threshold value Th = 0.5 | False | False | False | False | False | False |

TABLE 2

| Currently selected holding method: Pinching | | Object 1 | Object 2 | Object 3 | Object 4 | Object 5 | Average |
|---|---|---|---|---|---|---|---|
| First score | Pinching | 0.7 | 0.6 | 0.5 | 0.5 | 0.8 | 0.62 |
|  | Adsorption | 0.9 | 0.8 | 0.7 | 0.6 | 0.9 | 0.78 |
| Second score | Pinching/Adsorption | 0.78 | 0.75 | 0.71 | 0.83 | 0.89 | 0.79 |
|  | Threshold value Th = 0.5 | False | False | False | False | False | False |

TABLE 3

| Currently selected holding method: Pinching | | Object 1 | Object 2 | Object 3 | Object 4 | Object 5 | Average |
|---|---|---|---|---|---|---|---|
| First score | Pinching | 0.4 | 0.2 | 0.2 | 0.1 | 0.7 | 0.32 |
|  | Adsorption | 0.9 | 0.8 | 0.7 | 0.6 | 0.9 | 0.78 |
| Second score | Pinching/Adsorption | 0.44 | 0.25 | 0.29 | 0.17 | 0.78 | 0.38 |
|  | Threshold value Th = 0.5 | True | True | True | True | False | True |

In the case of an example shown in Table 1, since an average value of the second scores $T_{H,H0}$ (I) of the targets 1 to 5 is 1.03, which exceeds 1, it can be said that the ease of holding in the currently selected holding method $H_0$ (pinching) exceeds, on average, the ease of holding in the holding method (adsorption) to be evaluated. In addition, since the second scores $T_{H,H0}$ (I) of the targets 1 to 5 and an average value thereof all exceed the threshold value Th=0.5, the determination unit 306 of the control device 12 determines that it is not necessary to switch the holding methods.

Next, the holding strategy decision unit 307 decides a holding strategy so as to set a holding order in the descending order of the first score $S_{H0}$ (I), and to perform holding in an order of "a target 3 to a target 2 and a target 4 to a target 1 and a target 5" by "pinching" that is the currently selected holding method. Next, the control device 12 stores the decided holding strategy in the storage unit 302. Next, the holding strategy decision unit 307 decides "holding the target 3 by pinching" that is the earliest holding operation in the holding strategy as a next holding operation. In the example of Table 1, when the first scores $S_{H0}$ (I) of "pinching" for two or more targets are the same value, which one is prioritized in the holding strategy can be decided as appropriate in consideration of an arbitrary factor such as the position and the weight of an object O.

In the case of an example shown in Table 2, since the average value of the second scores $T_{H,H0}$ (I) of the targets 1 to 5 is 0.79, which is lower than 1, it can be said that the ease of holding in the currently selected holding method $H_0$ (pinching) is, on average, less than the ease of holding in the holding method (adsorption) to be evaluated. However, since the second scores $T_{H,H0}$ (I) of the targets 1 to 5 and the average value thereof all exceed the threshold value Th=0.5, the determination unit 306 of the control device 12 determines that it is not necessary to switch the holding methods.

Next, as in the case of Table 1, the holding strategy decision unit 307 decides a holding strategy so as to set a holding order in the descending order of the first score $S_{H0}$ (I), and to perform holding in an order of "the target 5 to the target 1 to the target 2 to the target 3 and the target 4" by "pinching" that is the currently selected holding method. Next, the control device 12 stores the decided holding strategy in the storage unit 302. Next, the holding strategy decision unit 307 decides "holding the target 5 by pinching" that is the earliest holding operation in the holding strategy as a next holding operation.

In the case of the example shown in Table 3, since the average value of the second scores $T_{H,H0}$ (I) of the targets 1 to 5 is 0.38, which is lower than 1, it can be said that the ease of holding in the currently selected holding method $H_0$ (pinching) is, on average, less than the ease of holding in the holding method (adsorption) to be evaluated. In addition, since the second scores $T_{H,H0}$ (I) of the targets 1 to 4 and the average value thereof are all below the threshold value Th=0.5, the determination unit 306 of the control device 12 determines that it is necessary to switch the holding methods.

Next, the holding strategy decision unit 307 compares a magnitude of the first score $S_H$ (I) between "pinching" and "adsorption" for each of the targets 1 to 5. In this example, since the first scores $S_H$ (I) by "adsorption" for the targets 1 to 5 all exceed the first score $S_{H0}$ (I) by "pinching," which is the currently selected holding method, the holding strategy decision unit 307 decides a holding strategy so as to switch the holding methods first. Furthermore, the holding strategy decision unit 307 decides a holding strategy so as to set a holding order after switching the holding methods in the descending order of the first score $S_H$ (I) by "adsorption"

which is a holding method after switching, and to perform holding in an order of "the target 1 and the target 5, the target 2, the target 3, and the target 4." Next, the control device 12 stores the decided holding strategy in the storage unit 302. Next, the holding strategy decision unit 307 decides "holding the target 1 by adsorption" or "holding the target 5 by adsorption" that is the earliest holding operation in the holding strategy as a next holding operation. Here, since the target 1 and the target 5 have the same first score $S_H$ (I) by adsorption, which one is prioritized can be decided as appropriate in consideration of arbitrary factors such as the position and the weight of the target 1 and the target 5.

Referring to FIG. 3 again, next, the control device 12 executes step S4. In step S4, the control device 12 specifically calculates the position at which the target object O decided in step S3 is held and the posture of the movable arm 100 at the time of holding the object (a holding position posture planning process).

When the holding method of the object O selected in step S3 is "pinching," the operation controller 303 of the control device 12 specifically calculates the position at which the object O is pinched and the posture of the movable arm 100 at the time of pinching the object in a method appropriately selected from known methods in step S4.

When the holding method of the object O selected in step S3 is "adsorption," the operation controller 303 of the control device 12 specifically calculates the position at which the object O is adsorbed and the posture of the movable arm 100 at the time of adsorbing the object in a method appropriately selected from known methods in step S4.

In the present embodiment, the holding method that can be selected is any one of "pinching" and "adsorption." For example, when "pinching and adsorption (hybrid)" are available, the operation controller 303 of the control device 12 can specifically calculate the position at which the object O is pinched and adsorbed and the posture of the movable arm 100 at the time of pinching and adsorbing the object in a method appropriately selected from known methods in step S4.

The operation controller 303 calculates whether the calculated holding operation can be used as an actual robot operation after calculating the position at which the object O is held and the posture of the movable arm 100 at the time of holding the object, and calculates the position at which the object O is held and the posture of the movable arm 100 at the time of holding the object again when it is determined that the holding operation cannot be used as the actual operation. When it is determined that the holding operation cannot be used as the actual operation, the processing may be returned to step S3 and restarted from planning of a holding strategy.

The calculation of the position at which the object O is held and the posture of the movable arm 100 require a very large amount of calculation. The control device 12 may calculate the position at which the object O is held and the posture of the movable arm 100 only for the selected object O. For this reason, the transport system 1 can significantly reduce the amount of calculation required as compared with other transport systems that calculates the position at which an object O is held and the posture of the movable arm 100 to select the object O to be held.

Next, the control device 12 executes step S5. In step S5, the determination unit 306 of the control device 12 determines whether it is necessary to switch holding methods. When the determination unit 306 determines that it is necessary to switch holding methods (Yes in step S5), that is, when a currently selected holding method and a holding method in a next holding operation are different, the control device 12 execute step S6. In step S6, the operation controller 303 switches the holding methods (a holding method switching process). For example, when "pinching" is switched to "adsorption," the operation controller 303 controls the movable arm 100 of the handling device 10 such that the second holding unit 200B is directed to the extraction source container V1 instead of the first holding unit 200A facing the extraction source container V1. On the other hand, when the determination unit 306 determines that it is not necessary to switch holding methods (No in step S5), that is, when a currently selected holding method and a holding method in a next holding operation are the same, the control device 12 advances processing to step S7 without executing step S6.

Next, the control device 12 executes step S7. In step S7, the control device 12 controls the holding unit 200 and the movable arm 100 on the basis of the position at which the object O is held, calculated in step S4, and the posture of the movable arm 100 (an operation control process). The selected object O is transported from the extraction source container V1 to the transport destination container V2 by the handling device 10.

Next, the control device 12 executes step S8. In step S8, the determination unit 306 of the control device 12 determines whether an order described in an order list has been completed. For example, the determination unit 306 determines whether the object O remains in the extraction source container V1. When the determination unit 306 determines that the object O remains in the extraction source container V1 (No in step S8), the control device 12 executes step S2 again. That is, the control device 12 acquires information on the state of the extraction source container V1 after the object O is picked up, the state of each of the holding units 200A and 200B, and the like again, and creates a next holding strategy on the basis of the information. Note that the control device 12 may decide a next holding operation on the basis of the holding strategy including a holding order, which is already created, without performing the holding strategy planning process. In addition, the control device 12 may modify or update the holding strategy already created on the basis of the acquired information, instead of performing the same holding strategy planning process. Moreover, the control device 12 may cause the score generation unit 304 to change a value of a parameter at the time of score generation or causes the threshold value generation unit 305 to change the threshold value Th after one or more holding operations are executed.

On the other hand, when the determination unit 306 determines that an order described in an order list has been completed (Yes in step S8), the control device 12 executes step S9 to end the control. For example, when the determination unit 306 determines that no object O remains in the extraction source container V1, the control device 12 executes step S9 to end the control.

According to the configuration of the first embodiment as described above, it is possible to efficiently decide a holding strategy that holds an object O while reducing the number of times holding methods are switched. The control device 12 of the transport system 1 selects a holding strategy without specifically calculating the position at which the object O is held, the posture of the movable arm 100, or the like. A holding strategy is, for example, to select a type of the handling device 10 to be used, an object O to be held, and a holding method. The control device 12 of the transport system 1 only needs to calculate the position at which an object O is held and the posture of the movable arm 100 only for the selected object O, thereby significantly reducing the required amount of calculation. In addition, when the currently selected holding method is reasonably easy to perform holding, since time required for switching holding methods can be saved by creating a holding strategy so as to preferentially use the currently selected holding method without switching holding methods, a total working time can be shortened.

Further, in the present embodiment, a plurality of holding methods include pinching and adsorption. As a result, the handling device 10 can hold various objects O such as a thin object O that is difficult to be held by pinching and an object O that has an uneven shape that is difficult to be held by adsorption.

Moreover, in the present embodiment, the control device 12 selects an object O to be held and a holding method on the basis of a score such that the number of times holding methods are switched is reduced. In addition, the control device 12 determines the necessity (the presence or absence) of switching holding methods on the basis of the score. As a result, the handling device 10 can execute a series of holding operations such that the number of times holding methods are switched is reduced as much as possible, and can reduce time required for entire work.

In addition, in the present embodiment, the control device 12 determines the necessity (the presence or absence) of switching holding methods on the basis of a magnitude relationship between a score and a predetermined threshold value Th. As a result, the control device 12 can easily determine the necessity of switching holding methods. Moreover, the control device 12 can create a holding strategy according to a situation by adjusting the threshold value Th.

Moreover, in the present embodiment, the control device 12 decides an order of holding the objects O on the basis of the score. As a result, the control device 12 can select a next holding operation in consideration of entire pick-up work specified in the order list.

In addition, in the present embodiment, the control device 12 decides an order of switching holding methods of the object. As a result, the control device 12 can select an optimum timing for switching holding methods in consideration of the entire pick-up operation specified in the order list.

Moreover, in the present embodiment, the control device 12 calculates a score for each area of an object O at the time of score calculation when a holding method is adsorption. As a result, the control device 12 can select an area of the same object O, which is the easiest to be held, as a target area to be held, so that a holding efficiency can be improved.

Moreover, in the present embodiment, the control device 12 calculates the ease of holding as a first score for each object O and each holding method, and a score based on the selected holding method is a second score calculated based on the first score for each object O and each holding method. As a result, the control device 12 can decide a holding operation on the basis of two viewpoints of the ease of holding an object O represented by the first score and a priority based on a currently selected holding method represented by the second score.

In addition, in the present embodiment, a second score for an object O and a holding method is a value obtained by dividing a first score for the object O or an area of the object O and a selected holding method by a first score for the object O or an area of the object O and the holding method.

As a result, the control device 12 can easily calculate a second score for determining the necessity of switching holding methods.

Second Embodiment

Next, a second embodiment will be described with reference to FIG. 10. The second embodiment is different from the first embodiment in that a plurality of holding strategies are created. A configuration other than described below is the same as that of the first embodiment.

Figure 10:
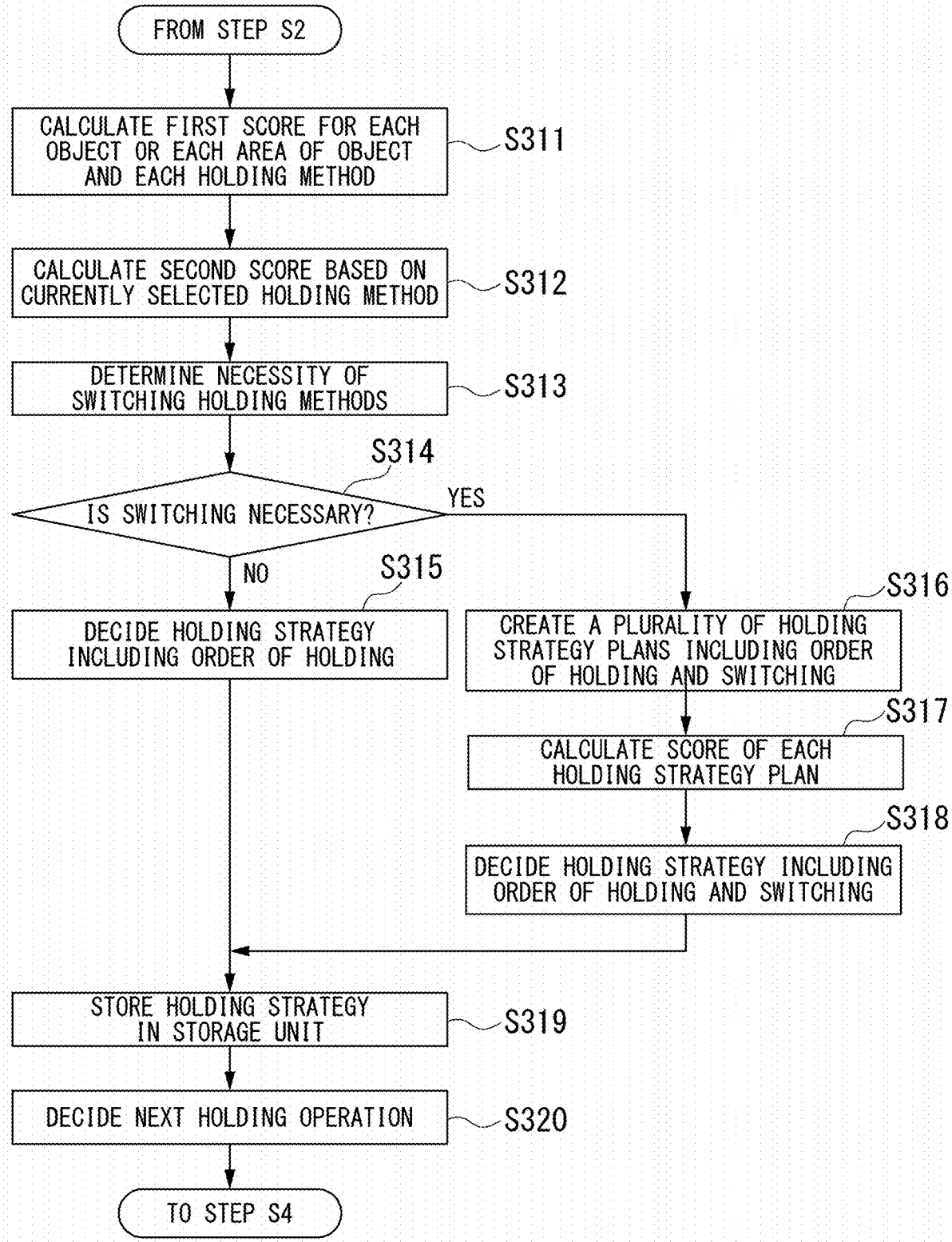
FIG. 10 is a control flowchart of a holding strategy planning process of a control device according to a second embodiment.

FIG. 10 is a control flowchart of the holding strategy planning process of the control device 12 according to the second embodiment.

In the second embodiment, the control device 12 executes steps S316 to S318 instead of step S306 of the first embodiment. In the holding strategy planning process (step S3), the control device 12 calculates a first score $S_H$ (I) (step S311), calculates a second score $T_{H,H0}$ (I) (step S312), and determines the necessity of switching holding methods (step S313) in the same manner as in the first embodiment. When the determination unit 306 determines that it is not necessary to switch holding methods (No in S314), the holding strategy decision unit 307 of the control device 12 decides a holding strategy including a holding order in the same manner as in the first embodiment (step S315), stores the holding strategy in the storage unit 302 (step S319), and decides a next holding operation on the basis of the holding strategy (step S320). That is, control content of the control device 12 when the determination unit 306 determines that it is not necessary to switch holding methods is the same as that of the first embodiment.

On the other hand, when the determination unit 306 determines that it is necessary to switch holding methods (Yes in S314), the control device 12 executes step S316. In step S316, the holding strategy decision unit 307 of the control device 12 creates a plurality of holding strategy plans including the order of holding and switching. For example, the holding strategy decision unit 307 creates a holding strategy plan with a relatively low overall success rate in which switching is performed once and a holding strategy plan with a relatively high overall success rate in which switching is performed twice on the basis of the first score $S_H$ (I).

Next, the control device 12 executes step S317. In step S317, the score generation unit 304 of the control device 12 calculates a score of each holding strategy plan created by the holding strategy decision unit 307. For example, the score generation unit 304 calculates scores of each holding strategy plan by setting the number of times holding methods are switched in a holding strategy plan, values such as an average value, a maximum value, a minimum value, and the like of the first score $S_H$ (I) for each holding operation, expected time required to complete a holding strategy, and the like as evaluation items. The score generation unit 304 can also appropriately change an weight of the evaluation item according to an input of an operator.

Next, the control device 12 executes step S317. In step S317, the holding strategy decision unit 307 of the control device 12 decides an optimum holding strategy on the basis of the score of each holding strategy plan generated by the score generation unit 304. For example, the holding strategy decision unit 307 selects a holding strategy plan having a maximum score as the holding strategy.

After that, the control device 12 stores the holding strategy decided by the holding strategy decision unit 307 in the storage unit 302 (step S319), and decides a next holding operation on the basis of the holding strategy (step S320).

Note that the control device 12 may omit the calculation of a second score and/or the determination of the necessity of switching (step S312 to S314), and create a plurality of holding strategy plans on the basis of the first score. For example, the holding strategy decision unit 307 can create a holding strategy plan with a lowest overall success rate in which switching is not performed, a holding strategy plan with a next lowest overall success rate in which switching is performed once, and a holding strategy plan with a highest overall success rate in which switching is performed twice. The score generation unit 304 calculates the score of each holding strategy plan, and the holding strategy decision unit 307 decides a holding strategy on the basis of this score. As a result, the control device 12 can decide a holding strategy for reducing the number of times holding methods are switched without performing the determination on whether to switch holding methods.

According to the configuration of the present embodiment, the control device 12 creates a plurality of holding strategies including at least one of the order of holding the objects O and the order of switching holding methods, and selects one of the plurality of holding strategies. As a result, the control device 12 can weigh a wide range of holding strategies and select a best holding strategy in terms of a success rate, the number of times holding methods are switched, and the like.

Moreover, in the present embodiment, the control device 12 selects one of the plurality of holding strategies such that the number of times holding methods are switched is reduced. As a result, the handling device 10 can execute a series of holding operations such that the number of times holding methods are switched is reduced as much as possible, and time required for entire work can be reduced.

Third Embodiment

Next, the third embodiment will be described. The third embodiment differs from the first embodiment in that a holding method is selected on the basis of a frequency of use of each holding method. A configuration other than described below is the same as that of the first embodiment.

The control device 12 records the frequency of use of each holding method in the storage unit 302. For example, the control device 12 can record a used holding method in the storage unit 302 each time the holding operation is performed, and calculate the frequency of use of each holding method on the basis of a usage history of a holding method. Alternatively, the control device 12 may record in the storage unit 302 that holding methods have been switched, and calculate the frequency of use of each holding method on the basis of a history of switching holding methods. As a result, the control device 12 can check how often each holding method has been used in the past.

The control device 12 can reduce the frequency of use of a frequently used holding method when there is a bias in the calculated frequency of use of each holding method or when it is determined that a usage limit of a holding method is approaching. For example, when the second score $T_{H,H0}(I)$ is calculated in step S302 of FIG. 9, the control device 12 can adjust parameters in the second score $T_{H,H0}(I)$ so as to lower the priority of selecting the frequently used holding method. Alternatively, for example, when the second score $T_{H,H0}(I)$ and the threshold value Th are compared in step S303 of FIG. 9, the control device 12 can cause the threshold value generation unit 305 to adjust the threshold value Th to lower the priority of selecting the frequently used holding method. Alternatively, for example, when a holding strategy including the holding and switching orders in step S306 of FIG. 9 is decided, the control device 12 can causes another holding method to hold an object O having a reasonably high first score $S_H(I)$ to avoid using the frequency used holding method as much as possible. Alternatively, for example, when the score of each holding strategy plan in step S317 of FIG. 10 is calculated, the control device 12 can adjust a parameter in the score so as to lower the priority of selecting the frequently used holding method.

For example, the control device 12 can calculate scores of pinching and adsorption by Equation 6 to be described below.

$$F(I)=g(w_1h_1S_p(I)+w_2h_2S_s(I))=w_3f_{item} \quad \text{[Math 6]}$$

In Equation 6, $w_1h_1+w_2h_2+w_3=1$, $w_i \geq 0$ (i=1,2,3), $h_j \geq 0$ (j=1,2). $S_p(I)$ is a first score when the mask area I indicating an object O or an area of the object O is held by "pinching." $S_s(I)$ is a first score when the mask area I indicating an object O or an area of the object O is held by "adsorption." $g(S_H(I), S_{H0}(I))$ is a function for calculating a second score. $f_{item}$ is a value normalized by multiplying the weight of object O by a coefficient. $h_1$ and $h_2$ are weights that adjust a degree of utilization of a current holding method. For example, $h_1$ and $h_2$ can hold their weights in a database or the like as table information as follows. In addition, the control device 12 may adjust the weights based on a result of calculating the first score $S_p(I)$ or $S_s(I)$.

TABLE 4

| Holding method | $h_1$ | $h_2$ |
|---|---|---|
| Adsorption | 0.9 | 0.1 |
| Pinching | 0.1 | 0.9 |

According to a configuration of the third embodiment as described above, the control device 12 selects an object O to be held and a holding method on the basis of the frequency of use of each holding method. As a result, the control device 12 can suppress a bias in a specific holding method by making adjustments to lower the priority of a frequently used holding method, so that a life of the holding unit 200 can be extended.

In addition, in the present embodiment, the control device 12 calculates a score on the basis of the frequency of use of each holding method. Alternatively, the control device 12 decides a threshold value Th on the basis of the frequency of use of each holding method, and determines the necessity (the presence of absence) of switching holding methods on the basis of a magnitude relationship between the score and the threshold value Th. As a result, the control device 12 can easily make adjustments so as to lower the priority of a frequently used holding method by modifying the score or the threshold value on the basis of the frequency of use of each holding method.

Fourth Embodiment

Next, a fourth embodiment will be described. The fourth embodiment is different from the first embodiment in that a holding method is selected on the basis of a result of detecting a physical state of each holding unit 200A or 200B. A configuration other than described below is the same as that of the first embodiment.

The control device 12 receives information on physical states of the first holding unit 200A and the second holding unit 200B from the third sensor 11C and the fourth sensor 11D. When a specific holding unit 200 is used repeatedly, measured values of physical sensors of the third sensor 11C and the fourth sensor 11D can change due to distortion, a shape change, a surface state change, and the like of the holding unit 200. The control device 12 estimates a usage state such as a wear state of the holding units 200A and 200B on the basis of the information on such a physical state. The control device 12 adjusts a score, a threshold value, holding and switching orders in a holding strategy, and the like so as to lower the priority or frequency of selecting the holding method for a holding method using the holding units 200A and 200B, which are presumed to be deteriorated or damaged, in the same manner as in the third embodiment.

According to the configuration of the fourth embodiment as described above, the control device 12 selects an object O to be held and a holding method on the basis of physical information of the holding unit 200. As a result, a priority of a holding method can be adjusted while physical deterioration or the like of the holding unit 200 is actually measured, so that a life of the holding unit 200 can be extended.

Fifth Embodiment

Next, a fifth embodiment will be described. The fifth embodiment differs from the first embodiment in that an algorithm using machine learning is used instead of a rule-based algorithm. A configuration other than described below is the same as that of the first embodiment.

In the present embodiment, calculation of a first score and a second score in the first embodiment is executed by machine learning. For example, when supervised learning is assumed, the evaluation function defined above can be used as an evaluation value at the time of learning. A learning algorithm is not limited to supervised learning, but can be changed depending on a type of learning such as unsupervised learning or reinforcement learning.

The control device 12 configures a learning network based on information acquired from the sensor 11, information obtained by a first score, information obtained by a second score, information required for the number of times holding methods are switched, and the like, thereby performing learning for being compatible with the success rate of a holding operation, the number of times holding methods are switched, and the evaluation of the frequency of use of a holding method, and adjusting a balance between them. For example, the control device 12 trained by machine learning can receive the information acquired in the information acquisition process (step S1) by the sensor 11 as an input, increase the success rate of a holding operation, suppress the switching of holding methods, and output one or more holding strategies and the like that include the scores for each target to be held and each holding method and the holding and switching orders, which are suitable for suppressing a bias of the frequency of use of a holding method.

When machine learning is used, it is assumed that $w_{p1}=w_{p2}=w_{p3}=w_{p4}=w_{p5}=0$ and $w_{s1}=w_{s2}=w_{s3}=w_{s4}=w_{s5}=0$ in an evaluation function of a first score in Equation 2 and Equation 3.

According to the configuration of the fifth embodiment as described above, the control device 12 can efficiently output a more appropriate score or holding strategy by repeatedly performing machine learning.

In each of the embodiments described above, the control device 12 decides an order of a holding operation and a switching operation after the necessity of switching is determined by comparing the second score $T_{H,H0}$ (I) with the threshold value Th, and may also decide the order of a holding operation and a switching operation such that the number of switching times is reduced without determining the necessity of switching. For example, the score generation unit 304 of the control device 12 may correct a value only of the first score $S_{H0}$ (I) in the currently selected holding method $H_0$ (for example, n times (n>1)) for the first score $S_H$ (I) indicating the simple ease of holding that does not consider the currently selected holding method, generate the second score $T_{H,H0}$ (I) with the same value as the first score $S_H$ (I) in other holding methods, and decide a holding strategy including an order of a holding operation and a switching operation on the basis of this second score $T_{H,H0}$ (I) such that the number of switching times is reduced as much as possible. In this case, it is not necessary for the control device 12 to determine the necessity of switching holding methods. A generation method of the second score $T_{H,H0}$ (I) including a correction method of the first score $S_H$ (I) is not limited to the example described above, and any method can be used as long as there is any bias such that the currently selected holding method is preferentially used.

In each of the embodiments described above, the handling device 10 includes the first handling device 10A that executes "pinching" and the second handling device 10B that executes "adsorption," but the configuration of the handling device 10 is not limited thereto, and may have one or more holding units that execute any holding method as long as one or more of a plurality of holding methods can be selected to hold an object. For example, the handling device 10 may further have another handling device in addition to the first handling device 10A and the second handling device 10B. The handling device 10 may have one hybrid hand capable of executing both "pinching" and "adsorption" instead of the first handling device 10A and the second handling device 10B. In addition, at least one of the first handling device 10A and the second handling device 10B may be a hybrid hand capable of executing both "pinching" and "adsorption." Such a hybrid hand may have, for example, a configuration in which a pinching unit and an adsorption unit are switched by a rotating unit rotating by 180°, may have a revolver-type configuration such as an optical microscope, or may also have another configuration. The handling device 10 may have two types of handling devices for adsorption, which are different in size, shape, characteristics, and the like. Alternatively, the handling device 10 may have a handling device that holds an object O in a holding method other than pinching and adsorption.

According to at least one embodiment described above, an operation time of a handling device can be shortened by creating a holding strategy so as to preferentially use the currently selected holding method on the basis of a score based on the currently selected holding method.

Although some embodiments of the present invention have been described, these embodiments are presented as examples and are not intended to limit the scope of the invention. These embodiments can be implemented in various other forms, and various omissions, replacements, and changes can be made within a range not departing from the gist of the invention. These embodiments and modifications thereof are included in the scope and gist of the invention as well as in the invention described in the scope of the claims and the equivalent scope thereof.

What is claimed is:

1. A handling system comprising:
   a movable arm;
   a robot hand that is attached to the movable arm and capable of holding an object by selecting one or more of a plurality of holding methods;
   a sensor configured to be capable of detecting a plurality of objects; and
   a controller configured to control the movable arm and the robot hand,
   wherein the controller calculates ease of holding as a first score for each object and each holding method on the basis of information acquired from the sensor,
   calculates a second score based on a selected holding method, for each object and each holding method, the second score being calculated by a function that depends on the first score of the selected holding method and the first score of the holding method that is the evaluation target of the second score,
   selects a next object to be held and a holding method on the basis of the second score, and
   calculates a position at which the selected object is held and a posture of the movable arm.

2. The handling system according to claim 1, wherein the plurality of holding methods include pinching and adsorption.

3. The handling system according to claim 1, wherein the controller selects the next object to be held and the holding method such that the number of times holding methods are switched is reduced.

4. The handling system according to claim 1, wherein the controller determines necessity of switching holding methods on the basis of the second score.

5. The handling system according to claim 4, wherein the controller determines necessity of switching holding methods on the basis of a magnitude relationship between the second score and a predetermined threshold value.

6. The handling system according to claim 1, wherein the controller decides an order of holding the objects on the basis of the second score.

7. The handling system according to claim 6, wherein the controller further decides an order of switching holding methods of the object objects.

8. The handling system according to claim 6, wherein the controller creates a plurality of holding strategies including at least one of the order of holding the objects and the order of switching the holding methods, and selects one of the plurality of holding strategies.

9. The handling system according to claim 8, wherein the controller selects one of the plurality of holding strategies such that the number of times holding methods are switched is reduced.

10. The handling system according to claim 1, wherein the controller selects the next object to be held and the holding method on the basis of a frequency of use of each holding method.

11. The handling system according to claim 10, wherein the controller calculates the second score on the basis of the frequency of use of each holding method.

12. The handling system according to claim 10, wherein the controller decides a threshold value on the basis of the frequency of use of each holding method and determines necessity of switching holding methods on the basis of the magnitude relationship between the second score and the threshold value.

13. The handling system according to claim 1, wherein the controller selects the next object to be held and the holding method on the basis of physical information of the robot hand.

14. The handling system according to claim 1, wherein the controller calculates the second score for each area of the object at the time of calculating the second score when a holding method is adsorption.

15. The handling system according to claim 1, wherein the second score for the object and a holding method is a value obtained by dividing the first score for the object and the selected holding method by the first score for the object and the holding method.

16. The handling system according to claim 1, wherein the handling system moves the object from a first position to a second position on the basis of the position and posture calculated by the controller.

17. A control device which controls a handling system including:
   a movable arm,
   a robot hand configured to be attached to the movable arm and capable of holding an object by selecting one or more of a plurality of holding methods, and
   a sensor configured to be capable of detecting a plurality of objects,
   wherein the control device calculates ease of holding as a first score for each object and each holding method on the basis of information acquired from the sensor,
   calculates a second score based on a selected holding method, for each object and each holding method, the second score being calculated by a function that depends on the first score of the selected holding method and the first score of the holding method that is the evaluation target of the second score,
   selects a next object to be held and a holding method on the basis of the second score, and
   calculates a position at which the selected object is held and a posture of the movable arm.

18. A non-transitory computer-readable storage medium storing a control program which controls a handling system including:
   a movable arm,
   a robot hand configured to be attached to the movable arm and capable of holding an object by selecting one or more of a plurality of holding methods,
   a sensor configured to be capable of detecting a plurality of objects, and
   a controller configured to control the movable arm and the robot hand,
   wherein the control program causes the controller to execute
   calculating ease of holding as a first score for each object and each holding method on the basis of information acquired from the sensor,
   calculating a second score based on a selected holding method, for each object and each holding method, the second score being calculated by a function that depends on the first score of the selected holding method and the first score of the holding method that is the evaluation target of the second score,
   selecting a next object to be held and a holding method on the basis of the second score, and
   calculating a position at which the selected object is held and a posture of the movable arm.

19. A handling method of handling goods by a handling system including:

a movable arm, a robot hand configured to be attached to the movable arm and capable of holding an object by selecting one or more of a plurality of holding methods, a sensor configured to be capable of detecting a plurality of objects, and a controller configured to control the movable arm and the robot hand, the handling method comprising the steps of:

calculating, by the controller, ease of holding as a first score b for each object and each holding method on the basis of information acquired from the sensor, calculating, by the controller, a second score based on a selected holding method, for each object and each holding method, the second score being calculated by a function that depends on the first score of the selected holding method and the first score of the holding method that is the evaluation target of the second score, selecting, by the controller, a next object to be held and a holding method on the basis of the second score, and calculating, by the controller, a position at which the selected object is held and a posture of the movable arm.

20. A handling system comprising:

a movable arm;

a robot hand configured to be attached to the movable arm and capable of holding an object to be held by selecting one or more of a plurality of holding mechanisms including one or more of a pinching mechanism, an adsorption mechanism, a magnetic mechanism, and a jamming gripper mechanism;

a sensor configured to be capable of detecting the object to be held; and a controller configured to control the movable arm and the robot hand, wherein the controller calculates ease of holding as a first score for each object and each holding mechanism on the basis of information acquired from the sensor, calculates a second score based on a selected holding mechanism, for each object and each holding mechanism, the second score being calculated by a function that depends on the first score of the selected holding mechanism and the first score of the holding mechanism that is the evaluation target of the second score, selects an object to be held and a holding mechanism that holds the object to be held after the selected holding mechanism on the basis of the second score, and calculates a position at which a holding mechanism, which holds the object to be held after the selected holding mechanism, holds the object to be held, and a posture of the movable arm.

* * * * *